ns Patent [19]

Bruschtein et al.

[11] 3,900,434
[45] *Aug. 19, 1975

[54] WALLBOARD TAPE JOINT COMPOSITION AND ADHESIVE THEREFOR CONTAINING WATER SOLUBLE POLYACRYLAMIDE, LIMESTONE, ASBESTOS, MICA AND CELLULOSE ETHER

[75] Inventors: Fabio B. Bruschtein; Dennis L. Lyftgot, both of Midland, Mich.

[*] Notice: The portion of the term of this patent subsequent to Feb. 19, 1991, has been disclaimed.

[73] Assignee: The Dow Chemical Company, Midland, Mich.

[22] Filed: Sept. 4, 1973

[21] Appl. No.: 393,854

[52] U.S. Cl................. 260/17 R; 161/205; 161/250
[51] Int. Cl............................................. C08b 21/32
[58] Field of Search ................................. 260/17 R

[56] References Cited
UNITED STATES PATENTS
3,793,269  2/1974  Bruschtein et al.................... 260/17

*Primary Examiner*—Howard E. Schain
*Attorney, Agent, or Firm*—Richard W. Hummer

[57] ABSTRACT

Improved wallboard tape joint compositions comprising finely divided minerals, such as calcium carbonate, mica and asbestos and a conditioner, such as a water-soluble cellulose ether, are provided by employing as a binder a polyacrylamide having a low degree of hydrolysis and a particularly defined range of molecular weight whereby aqueous solutions of the polymer have a viscosity of at least 2.4 centipoises for a 0.5% solution but not more than 700 centipoises for a 5.1% solution.

7 Claims, No Drawings

3,900,434

WALLBOARD TAPE JOINT COMPOSITION AND ADHESIVE THEREFOR CONTAINING WATER SOLUBLE POLYACRYLAMIDE, LIMESTONE, ASBESTOS, MICA AND CELLULOSE ETHER

BACKGROUND OF THE INVENTION

In our copending application Ser. No. 273,843, filed July 21, 1972, now U.S. Patent 3,793,269, there are disclosed wallboard tape joint compositions comprising a mixture of finely divided mineral solids, a water-soluble cellulose ether and as a binder a defined polyacrylamide having a low degree of hydrolysis and being characterized by an Ostwald viscosity of 1.6 to about 2.4 centipoises for an aqueous 0.5 percent by weight solution thereof under defined conditions. In practice, however, it has been found that while polymeric binders as defined in our copending application can be used under good drying conditions, higher molecular weight materials are needed to provide the necessary adhesion under adverse drying conditions such as high humidity conditions. Further, with the polymers available at the time of our prior application the use of polyacrylamides having Ostwald viscosities of above 2.4 centipoises under the defined conditions produced compositions with poor workability at practical water contents. Thus, it is an object of the present application to provide compositions embodying a carefully defined class of polyacrylamides having superior adhesion under adverse drying conditions without sacrificing desirable workability properties.

SUMMARY OF THE INVENTION

In accordance with the present invention it has been discovered that greatly improved adhesive properties in a polyacrylamide and in tape joint compositions embodying same can be obtained without sacrifice of workability of said compositions by employing polyacrylamides having a low degree of hydrolysis and characterized by a narrow molecular weight range defined by a minimum Ostwald viscosity of a 0.5 percent solution thereof and by a maximum Brookfield viscosity of a 5.1 percent solution thereof as specified hereinafter. Such polyacrylamides are employed in the form of finely divided solids having a particle size such that substantially 100 percent thereof passes through a screen having 35 meshes to the inch; preferably the finely ground polymer should pass substantially 100 percent through a screen of 40 meshes to the inch.

Precise measurements of the actual molecular weight of water-soluble polymers such as polyacrylamide are difficult and tedious to obtain. In general, in this art the viscosity of solutions of the polymer under carefully defined conditions have been employed as an index correlated with the molecular weight. The polyacrylamides employed in accordance with the present invention are characterized by a viscosity of at least 2.4 centipoises for a 0.5 percent by weight solution of the polymer in distilled water adjusted to a pH of 3 as determined with an Ostwald viscosimeter at a temperature of 25°C. The viscosity so determined will be referred to in the present specification and claims as the "Ostwald viscosity." In addition to the above lower limit on Ostwald viscosity the polymers must have a viscosity of no greater than 700 centipoises and preferably no greater than 600 centipoises for an aqueous 5.1 percent by weight solution of the polymer in 1 percent borax solution at a pH of 9.2 as determined with a Brookfield viscosimeter at 25°C. using the No. 3 spindle operating at 50 revolutions per minute. The latter viscosity determined under the specified conditions is referred to herein as the "Brookfield viscosity." Preferably the polyacrylamide has an Ostwald viscosity as defined above in the range of from 2.45 to 2.7 centipoises and all such polyacrylamides have a low degree of hydrolysis whereby only about 5 percent or less of the original carboxamide groups in the polymer have been hydrolyzed to carboxylic acid groups. The foregoing limits on the Ostwald viscosity and the Brookfield viscosity are critical for obtaining the desired improvement in adhesion without producing final tape joint compositions which become so viscous as to be unworkable at practical water contents.

The proportions of the mineral filler ingredients employed in the compositions of the invention may vary depending upon the particular end use envisioned. Generally, the compositions will comprise from about 55 to 88 percent by weight of finely ground limestone; from about 2 to about 20 percent, preferably from about 3 to 10 percent, by weight of asbestos; from about 5 to about 20 percent by weight of mica and 0 to 5 percent of other minerals such as talc and the like. Typical conventional compositions to be mixed with water and applied to the wallboard joint immediately prior to the application of the tape contain from about 60 to 80 percent by weight of ground limestone, 6 to 20 percent of asbestos, 6 to 20 percent of mica and 0 to 5 percent of talc together with 0.25 to 1 percent of a conditioner such as a water-soluble cellulose ether and up to about 8 percent of a water-soluble binder. It is among the advantages of the present invention that excellent adhesion is obtained with only from about 1.5 to about 5 percent by weight of the polyacrylamide binder. Further, when employing the polyacrylamides as herein defined, tape joint compositions having excellent adhesion and workability properties can be prepared with minimal proportions of asbestos which is desirable not only from the standpoint of economics but also because of the possible health hazards in the use of large amounts of asbestos. Thus, it is preferred to employ compositions containing not more than 6 percent of each of mica and asbestos with our polyacrylamide binders and good results have been obtained with compositions containing 3 percent or less of asbestos.

The mineral fillers employed are readily available commodities and standard commercial grades thereof are satisfactory provided that each filler ingredient is finely ground as discussed hereinafter. The ground limestone may be predominantly calcite or may include magnesium carbonate as found in dolomitic limestone.

The water-soluble cellulose ether employed may be a hydroxyethylcellulose or a hydroxyalkyl methylcellulose. This ingredient contributes to the workability of the paste resulting from incorporating water into the dry composition and provides a desirable effect on the drying rate whereby cracking of the dried paste is minimized. Good results have been obtained when employing a finely ground hydroxypropyl methylcellulose sold by The Dow Chemical Company under the trademark Methocel 228.

Suitable polyacrylamides, having the desired low degree of hydrolysis and the proper range of molecular weight as evidenced by the viscosity of the product, may be prepared by polymerizing aqueous acrylamide monomer under controlled conditions of temperature, pH and catalyst concentration. A polyacrylamide having the desired properties may be prepared in the following manner. A 20 to 25 percent by weight solution of acrylamide monomer containing from about 40 to 100 p.p.m. of cupric ion in deionized water is adjusted to a pH of 5.7 to 7.2 and a temperature of about 25°C. and sparged with nitrogen for 10 minutes to purge the solution of inhibitory oxygen. On completion of the purging, a 10 percent solution of the pentasodium salt of (carboxymethylimino) bis(ethylenenitrilo)tetraacetic acid (Versenex 80) is added in amount to provide from about 300 to 600 parts of the Versenex 80 compound per million parts of monomer, depending upon the initial copper content. Thereafter, while stirring vigorously, separate streams of aqueous 10 percent solution of sodium persulfate and aqueous 10 percent solution of sodium bisulfite are added in amount to provide about 500 to 800 parts of the persulfate and about 500 to 1100 parts of the bisulfite per million parts of monomer to act as polymerization catalyst. Reaction is initiated by addition of the catalyst and the temperature of the reaction mixture rises to about 75°–88°C. in a period of from about 2 to 12 minutes. The reaction mixture is maintained at 60°–80°C. for about 30 additional minutes to complete the polymerization and the product is dried in any suitable fashion as, for example, on a double drum drier. Conventional additives such as a sodium acetate buffer can be employed and if the polymer is to be dried on a drum drier it is convenient to add a roll release agent such as a long chain alkyl phenoxybenzene sulfonate. For purposes of the present invention the dried polymer is finely ground as, for example, in a high-speed hammer mill and sieved to obtain a product of which substantially 100 percent passes a screen having 40 meshes to the inch.

In carrying out the invention, it is desirable that all of the constituents be individually finely ground prior to blending. Substantially all of the mineral constituents should be ground to pass a screen having 100 meshes to the inch while the cellulose ether and polyacrylamide should pass a screen having 35 meshes to the inch and preferably 40 meshes to the inch. The ingredients are measured out and blended together in any desired order provided efficient mixing equipment is employed to assure homogeneous mixing of the ingredients. If desired, the final mixture may be run through a hammer mill or the like for further assurance of homogeneity.

In use, the dry composition is mixed with sufficient water, generally from about 60 to 95 milliliters of water per 100 grams of dry mix, to produce the proper consistency for application. After thorough mixing of the dry ingredients with the water, the resulting mixture is allowed to stand for at least ten minutes, preferably at least 30 minutes, and is then applied to the gypsum wallboard joint employing a conventional flat instrument or knife to provide a thickness of 25 to 70 mils of the moist composition. Cellulosic joint tape is then applied over the composition and pressed in place with the knife. Under conditions of normal room temperature and humidity, the composition cures in a period of about 18 hours. Under higher humidity conditions, longer cure times must be allowed.

In representative operations the following mineral filler mixtures were prepared by thorough mixing of the dry ingredients and blending thereof homogeneously in a twin shell blender for a period of about 45 minutes.

| Ingredient | Percent by Weight of Mineral Formulation: | | |
| --- | --- | --- | --- |
| | A | B | C |
| Limestone | 87 | 75 | 51 |
| Mica | 6 | 12 | 24 |
| Asbestos | 6 | 12 | 24 |
| Talc | 1 | 1 | 1 |

Each of the ingredients employed above was finely ground so that essentially 100% thereof passed a screen having 100 meshes to the inch. A series of tape joint compositions was prepared by blending 97.75% by weight of each of the above mineral filler formulations with 0.25% of a hydroxypropyl methylcellulose (Methocel 228) and 2% of polyacrylamide binder. Further series of tape joint compositions was prepared by blending 96.75% by weight of each of the above formulations with 0.25% of the hydroxypropyl methylcellulose and 3% of the polyacrylamide binder. The polyacrylamide employed had about 0.3% of its carboxyamide groups hydrolyzed to carboxyl groups and was characterized by an Ostwald viscosity of 2.5 centipoises for a 0.5% by weight solution thereof and a Brookfield viscosity of 404 centipoises for a 5.1% by weight solution thereof.

It was found that to obtain proper workability it was necessary to increase the amount of water employed in making the final paste mix as the proportion of mica and asbestos in the mineral formulation increased. Thus, with the above compositions, to obtain proper workability, for each 100 grams of powdered composition Formulation A required 65 milliliters, Formulation B, 70 milliliters and Formulation C, 115 milliliters of water, respectively. The water was added with stirring to form a paste and the latter was allowed to stand for 30 minutes and then checked for workability. On determining that the paste possessed proper workability, a portion of the paste was applied to a piece of gypsum wallboard with a wallboard knife to supply a layer of paste about 25 mils in thickness and the cellulosic wallboard tape was then pressed firmly and uniformly into the paste with the wallboard knife. The resulting test piece was conditioned in a chamber under controlled conditions of temperature and humidity for 24 hours. The test piece was then checked by a standard evaluation method for adhesion by making an X cut through the tape with a sharp wallboard knife, pulling up the tape sharply from the points of the intersecting knife cuts and determining the percentage area where the tape has adhered to the composition. Adhesion of 100 percent is defined as the condition in which the tape delaminates within itself over the entire test area. If the above conditioning is carried out under good drying conditions such as at a temperature of 70°F. with 30% relative humidity, the test piece may be dry enough for final testing for adhesion immediately after removal from the conditioning chamber. However, when the test piece has been conditioned under high humidities such as 80 to 95% relative humidity, said test piece is given a qualitative pull test as described above on removal from the conditioning chamber and is then further dried under ambient room temperature and humidity for a period of 4 to 6 hours and is then quantitatively evaluated for adhesion at two further X-cuts as described. Average adhesion values of 90–100% from such tests are rated excellent while such values of from about 75 to 90% are rated good adhesion.

When the above-described compositions containing 3% of the defined polyacrylamide binder in Formulations A, B and C were applied in the above test, good to excellent adhesion was obtained with Formulations A and B when conditioned at either high humidity conditions (30°F.; 80% relative humidity) or low humidity conditions (70°F.; 30% relative humidity) while only poor adhesion was obtained with Formulation C under either of the conditions. When the compositions containing only 2% of the polyacrylamide binder were tested in similar fashion, only the composition prepared from Formulation A gave acceptable adhesion while poor results were obtained with the higher proportions of mica and asbestos in Formulations B and C.

In a further comparative determination under highly adverse conditions, the above composition containing 3% of the polyacrylamide, characterized by an Ostwald viscosity of 2.5 and a Brookfield viscosity of 404 centipoises, and 0.25% of Methocel 228 in Formulation A was tested as described above with conditioning for 24 hours at 100°F. and 95% relative humidity. Good to excellent adhesion was obtained. In contrast when the determination was repeated under exactly similar conditions, except that the polyacrylamide employed was characterized by an Ostwald viscosity of only 2.34 centipoises under the prescribed conditions, only fair adhesion was obtained even though this latter polyacrylamide gave excellent adhesion when conditioned under low humidity conditions.

When other polyacrylamides were tested in the above formulation it was found that when such polymers were characterized by an Ostwald viscosity of less than 2.4 or a Brookfield viscosity greater than 700 centipoises under the specified conditions for said determination the tape joint composition was inferior in one or more of the tests for adhesion or workability, particularly when conditioned under high humidity. When the polyacrylamide employed had a particle size such that any substantial portion thereof would not pass a sieve having 35 meshes to the inch the resulting paste contained undesirable gel-like masses.

As is well recognized in the polyacrylamide art, substantially similar polymers may be prepared by hydrolyzing homopolymeric acrylamide or by copolymerizing acrylamide and acrylic acid. Thus, reference in the present specification and claims to polyacrylamide hydrolyzed to a degree of up to about 5 percent is intended to be inclusive of copolymers of acrylamide with up to about 5 mole percent of acrylic acid or an alkali metal acrylate.

We claim:

1. In a dry powder composition suitable on admixture with water for adhering and covering wallboard joint tapes which comprises a major proportion of up to about 88 percent by weight of minus 100 mesh ground limestone, from about 2 to about 20 percent by weight of asbestos, from about 5 to about 20 percent by weight of minus 100 mesh mica, from about 0.25 to about 1 percent by weight of water-soluble cellulose ether and from about 1.5 to about 5 percent by weight of a water-soluble polyacrylamide, said polyacrylamide having a low degree of hydrolysis of from 0 to about 5 percent, the improvement which consists in employing a polyacrylamide characterized by (1) an Ostwald viscosity of at least 2.4 centipoises for a 0.5 percent by weight solution thereof in distilled water and (2) a Brookfield viscosity of no greater than 700 centipoises for a 5.1 percent by weight solution thereof in aqueous 1 percent borax solution, said polyacrylamide being in the form of finely divided solids having a particle size such that substantially 100 percent thereof passes through a screen having 35 meshes to the inch.

2. A composition according to claim 1 wherein the polyacrylamide is characterized by a viscosity of 2.45 to 2.7 centipoises for a 0.5 percent by weight solution under the test conditions.

3. A composition according to claim 2 wherein the polyacrylamide is hydrolyzed to the extent of 0 to about 1 percent.

4. A composition according to claim 1 wherein the mineral filler consists essentially of about 75 to 88 percent of ground limestone, about 3 to 10 percent of asbestos and about 5 to 20 percent of mica.

5. A dry powder composition suitable on admixture with water for adhering and covering wallboard joint tapes which comprises in finely ground form from about 55 to 88 percent of limestone, from about 2 to 20 percent of asbestos, from about 5 to 20 percent of mica, from 0.25 to 1 percent of a water-soluble cellulose ether and from about 1.5 to about 5 percent by weight of a polyacrylamide, having a low degree of hydrolysis in the range of 0 to 5 percent and characterized by (1) an Ostwald viscosity of at least 2.4 centipoises for a 0.5 percent by weight solution thereof in distilled water adjusted to a pH of 3 and at a temperature of 25°C. and (2) a Brookfield viscosity of not more than 700 centipoises for an aqueous 5.1 percent by weight solution thereof in 1 percent borax solution at a pH of 9.2 and at a temperature of 25°C. said polyacrylamide being in the form of finely divided solids having a particle size such that substantially 100 percent thereof passes through a screen having 35 meshes to the inch.

6. A composition according to claim 5 wherein the Brookfield viscosity of the polyacrylamide is no greater than 600 centipoises.

7. A composition according to claim 6 wherein the polyacrylamide is employed in the amount of from 2 to 3 percent by weight.

* * * * *